Dec. 23, 1924.
J. KAUFF
BRAKE BAND
Filed July 22, 1924
1,520,655
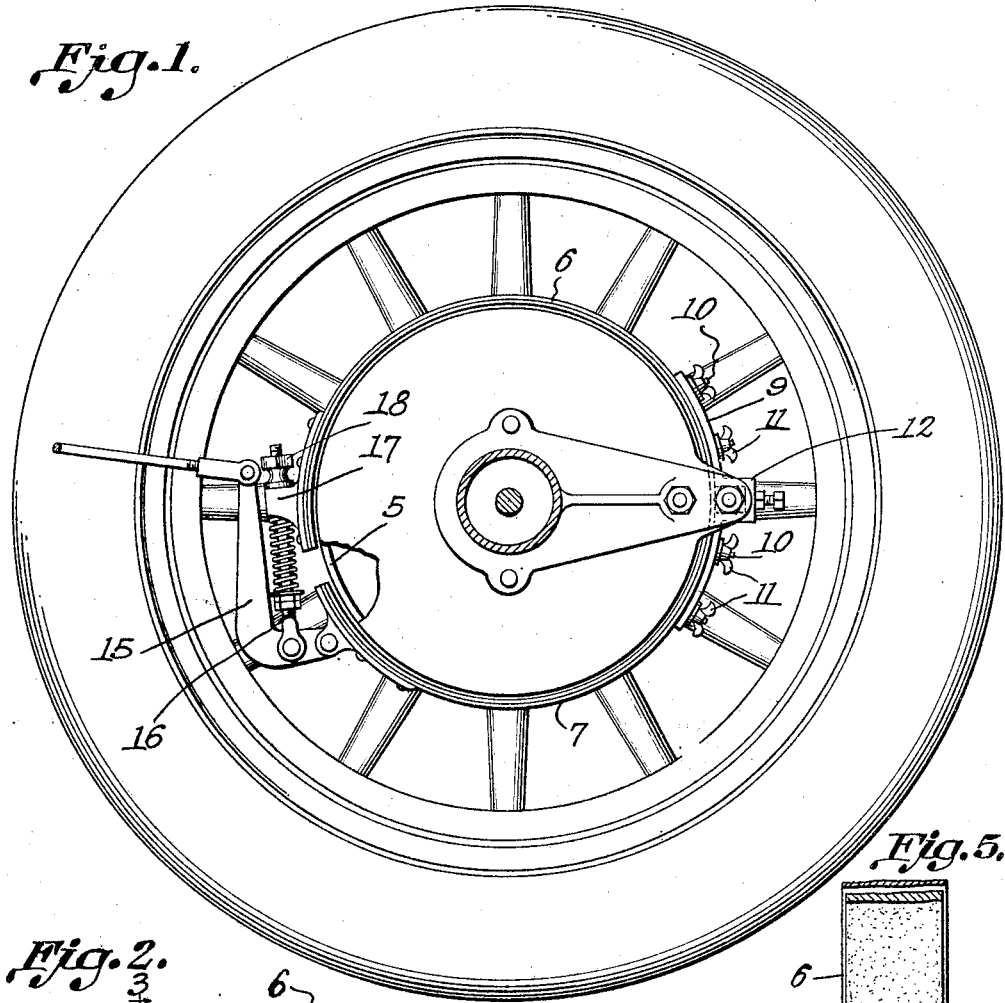
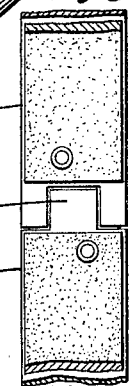
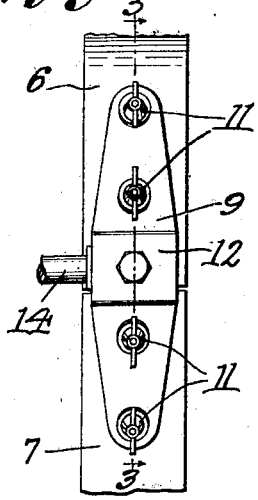
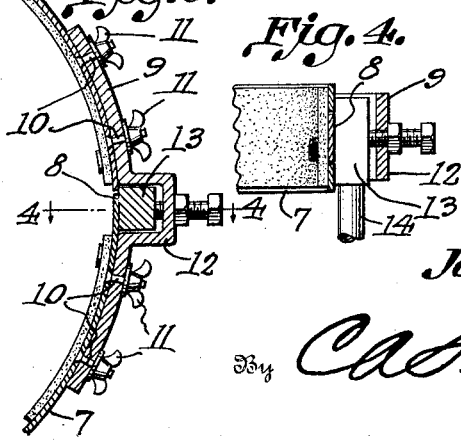
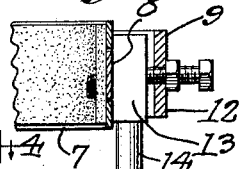
Inventor
John Kauff Patented Dec. 23, 1924.

1,520,655

UNITED STATES PATENT OFFICE.

JOHN KAUFF, OF GLEN MORGAN, WEST VIRGINIA.

BRAKE BAND.

Application filed July 22, 1924. Serial No. 727,510.

*To all whom it may concern:*

Be it known that I, JOHN KAUFF, a citizen of the United States, residing at Glen Morgan, in the county of Raleigh and State of West Virginia, have invented a new and useful Brake Band, of which the following is a specification.

This invention relates to motor vehicle brakes and more particularly to the construction of the brake band.

The primary object of the invention is to provide a separable brake band of a construction to permit the same to be readily and easily disconnected from its support to reline the same, eliminating the necessity of removing the wheel to remove the brake band.

A still further object of the invention is to provide means for supporting the sections of the brake band to insure a rigid construction and provide a brake band which will operate with the same accuracy as the usual one-piece brake band now in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a wheel disclosing a brake band constructed in accordance with the invention as mounted thereon.

Figure 2 is a rear elevational view disclosing the adjacent ends of a brake band as connected.

Figure 3 is a sectional view taken on line 3—3 of Figure 2.

Figure 4 is a sectional view taken on line 4—4 of Figure 3.

Figure 5 is a fragmental elevational view disclosing the inner surfaces of the connected ends of the brake band.

Referring to the drawing in detail, the reference character 5 indicates the usual brake drum which is carried by the wheel and is of the well known construction.

The brake band forming the essence of the present invention includes an upper section 6 and a lower section 7, the upper section 6 being formed with a cut out portion to accommodate the tongue 8 of the section 7 providing a connection to insure against lateral movement of one section of the brake band with respect to the adjacent section.

As clearly shown by Figure 3 of the drawing the securing yoke which is indicated at 9 is formed with suitable openings to accommodate the bolts 10 that extend therethrough, wing nuts 11 being provided on the threaded ends of the bolts to secure the band sections to the yoke in a manner to prevent accidental displacement thereof, but at the same time provide a structure which will permit the sections to be readily and easily disconnected from the yoke 9 to reline the sections.

This yoke is provided with the usual offset portion 12, that accommodates the squared portion 13 of the supporting shaft 14 extending from the bracket 15 that is mounted in the usual manner to the motor vehicle construction.

From the foregoing it will be obvious that due to this construction, the rear or connected ends of the sections may be readily and easily removed by merely removing the winged nuts 11.

The usual operating arm 15 has pivotal connection with the forward end of the lower section 7 and supports the usual bolt 16 that passes through the lugs 17 secured to the upper section 6, the lugs 17 being supplied with an opening to accommodate the bolt 16.

The adjusting nut 18 which is mounted on the threaded end of the bolt may be readily removed from the bolt to disconnect the sections 6 and 7 from their forward ends, when it is necessary to remove the brake band.

From the foregoing detail description it is thought that a further detail description as to the operation of the device is unnecessary.

I claim:—

1. A brake band including an upper section and a lower section, means for connecting the sections to prevent lateral movement of one section with respect to the other section, a yoke having connection with the sections, and means for removably securing the sections to the yoke.

2. A brake band including an upper section and a lower section, the upper section having a cut out portion formed in one end thereof, the lower section having a tongue adapted to be fitted in the opening to prevent lateral movement of the sections with respect to each other, a yoke for supporting the connected ends of the sections, and means for removably securing the sections to the yoke.

In testimony that I claim the foregoing as my own, I have hereto affixed my signature in the presence of two witnesses.

JOHN KAUFF

Witnesses:
J. HUGH MILLER,
T. N. THURMAN.